(12) United States Patent
Tobkin

(10) Patent No.: US 12,383,920 B2
(45) Date of Patent: Aug. 12, 2025

(54) REMOTE SPRAY FOAM METHOD

(71) Applicant: Nathan John Tobkin, Perham, MN (US)

(72) Inventor: Nathan John Tobkin, Perham, MN (US)

( * ) Notice: Subject to any disclaimer, the term of this patent is extended or adjusted under 35 U.S.C. 154(b) by 0 days.

(21) Appl. No.: 18/900,620

(22) Filed: Sep. 27, 2024

(65) Prior Publication Data

US 2025/0018417 A1 Jan. 16, 2025

Related U.S. Application Data

(63) Continuation-in-part of application No. 18/441,893, filed on Feb. 14, 2024.

(60) Provisional application No. 63/485,238, filed on Feb. 15, 2023.

(51) Int. Cl.
*B05B 15/50* (2018.01)
*B05B 7/00* (2006.01)
*B05B 13/04* (2006.01)
*B25J 11/00* (2006.01)

(52) U.S. Cl.
CPC ............ *B05B 15/50* (2018.02); *B05B 7/0018* (2013.01); *B05B 13/0431* (2013.01); *B25J 11/0075* (2013.01)

(58) Field of Classification Search
CPC ................................................ B05B 13/0278
See application file for complete search history.

(56) References Cited

U.S. PATENT DOCUMENTS

| | | | |
|---|---|---|---|
| 5,183,066 A | 2/1993 | Hethcoat | |
| 5,358,568 A | 10/1994 | Okano | |
| 5,693,150 A | 12/1997 | Powell | |
| 10,946,404 B2 * | 3/2021 | Tarantini | B05B 15/55 |
| 11,499,325 B2 | 11/2022 | Telleria et al. | |
| 11,673,156 B2 | 6/2023 | Hargadon | |
| 11,878,317 B2 * | 1/2024 | Fritz | B05D 1/02 |
| 2006/0275552 A1 | 12/2006 | Vendlinski et al. | |
| 2009/0304940 A1 | 12/2009 | Heldt | |
| 2010/0143089 A1 | 6/2010 | Hvass | |
| 2016/0052126 A1 * | 2/2016 | Chin | B05D 1/02 |
| | | | 427/256 |
| 2016/0121486 A1 * | 5/2016 | Lipinski | B05B 13/0431 |
| | | | 427/427.3 |
| 2018/0283019 A1 * | 10/2018 | Telleria | B24B 55/06 |
| 2019/0255551 A1 | 8/2019 | Hargadon | |
| 2020/0055193 A1 * | 2/2020 | Lipinski | B25J 5/007 |
| 2020/0331041 A1 * | 10/2020 | Yang | B08B 3/024 |
| 2021/0094056 A1 | 4/2021 | Storr | |

(Continued)

OTHER PUBLICATIONS

John McManus, Here's a Robot that Solves for Prefab Wall Panel Spray Foam Insulation, https://www.thebuildersdaily.com/robot-spray-foam-insulation-offers-offsite-wall-panel-solution/, Jul. 13, 2021, the Builder's Daily Technology, the Builder's Daily.

*Primary Examiner* — Karl Kurple
(74) *Attorney, Agent, or Firm* — Fargo Patent & Business Law; Thomas Kading; Joshua Krank

(57) ABSTRACT

A method for operating a remote spray foam system includes remotely spraying foam from a hand-held spray gun removably mountable to a remote manipulator, the remote manipulator mounted to a mobile platform; and periodically cleaning a nozzle of the hand-held spray gun at a cleaning station mounted to the mobile platform.

16 Claims, 12 Drawing Sheets

(56) References Cited

U.S. PATENT DOCUMENTS

| | | |
|---|---|---|
| 2022/0009098 A1* | 1/2022 | Cwik ..................... B25J 9/1664 |
| 2022/0080444 A1 | 3/2022 | Park et al. |
| 2022/0143640 A1 | 5/2022 | Raman et al. |
| 2022/0212210 A1 | 7/2022 | Feller |
| 2022/0305514 A1 | 9/2022 | Pungetti |
| 2022/0410189 A1 | 12/2022 | Yamauchi |
| 2023/0259082 A1* | 8/2023 | Cwik ..................... G05B 15/02 |
| | | 700/28 |
| 2024/0183177 A1* | 6/2024 | Telleria ............... B05B 13/0431 |
| 2024/0198374 A1* | 6/2024 | Yamauchi ........... B05B 13/0452 |

* cited by examiner

REMOTE SPRAY FOAM METHOD

CROSS REFERENCE TO RELATED APPLICATION[S]

This application claims the priority as a continuation-in-part of U.S. Nonprovisional patent application Ser. No. 18/441,893 (02120-TOB) filed Feb. 14, 2024 which claims priority to U.S. Provisional Patent Application No. 63/485,238 filed Feb. 15, 2023. Each of the aforementioned patent applications, and any applications related thereto, are herein incorporated by reference in their entirety.

BACKGROUND

The present disclosure relates to a remote spray foam system.

Even with effective engineering controls, personnel who work with spray polyurethane foam (SPF) chemicals still need to wear appropriate Personal Protective Equipment (PPE). Generally, PPE is required for applicators and adjacent workers who may enter a spray foam application work area. However, bear in mind that formulations of SPF may vary, particularly with respect to B-side chemicals. Appropriate work area restrictions (signs or tape) are typically required to limit entry into the spray enclosure or spray area to personnel wearing proper PPE until the level of airborne concentrations of chemical substances is below the applicable occupational exposure limits.

Generally, PPE requirements include respiratory protection. Air-purifying respirators (APR) and powered air-purifying respirators (PAPR) are generally appropriate for exterior applications and may be used when spraying polyurethane foam in exterior applications. Supplied air respirators (SAR) are typically used in interior applications.

SUMMARY

A method for operating a remote spray foam system according to one disclosed non-limiting embodiment of the present disclosure includes remotely spraying foam from a hand-held spray gun removably mountable to a remote manipulator, the remote manipulator mounted to a mobile platform; and periodically cleaning a nozzle of the hand-held spray gun at a cleaning station mounted to the mobile platform.

A further embodiment of any of the foregoing embodiments of the present disclosure includes that the periodically cleaning comprises moving the nozzle to a preprogrammed position.

A further embodiment of any of the foregoing embodiments of the present disclosure includes that the preprogrammed position comprises a position that locates the nozzle against a brush system.

A further embodiment of any of the foregoing embodiments of the present disclosure includes that the preprogrammed position comprises a position that locates the nozzle adjacent to an internal nozzle cleaner system.

A further embodiment of any of the foregoing embodiments of the present disclosure includes that the internal nozzle cleaner system comprises a tool that enters the nozzle to internally clean the nozzle.

A further embodiment of any of the foregoing embodiments of the present disclosure includes that the preprogrammed position comprises a position that locates the nozzle adjacent to a solvent sprayer system.

A further embodiment of any of the foregoing embodiments of the present disclosure includes that the periodically cleaning comprises overriding current spraying operations to automatically position the nozzle with respect to the cleaning station.

A further embodiment of any of the foregoing embodiments of the present disclosure includes that the periodically cleaning occurs at a predetermined time period.

A further embodiment of any of the foregoing embodiments of the present disclosure includes that the predetermined time period is 20 minutes.

A further embodiment of any of the foregoing embodiments of the present disclosure includes that the periodically cleaning occurs in response to a thickness of the foam being applied.

A further embodiment of any of the foregoing embodiments of the present disclosure includes that the thickness of the foam being applied is determined by a measurement from the remote manipulator.

A further embodiment of any of the foregoing embodiments of the present disclosure includes that the measurement from the remote manipulator comprises a difference between a foam surface and a surface to which the foam is being applied.

A further embodiment of any of the foregoing embodiments of the present disclosure includes that the periodically cleaning occurs in response to difference between the foam surface and the surface to which the foam is being applied being less than a predetermined value.

A method for operating a remote spray foam system according to one disclosed non-limiting embodiment of the present disclosure includes remotely spraying foam from a hand-held spray gun removably mountable to a remote manipulator, the remote manipulator mounted to a mobile platform; and overriding current spraying operations to position a nozzle of the hand-held spray gun with respect to a cleaning station mounted to the mobile platform, the position of the nozzle comprises a first position that locates the nozzle against a brush system of the cleaning station, and a second position that locates the nozzle adjacent to an internal nozzle cleaner system of the cleaning station.

A further embodiment of any of the foregoing embodiments of the present disclosure includes that the overriding current spraying operations occurs at a predetermined time period.

A further embodiment of any of the foregoing embodiments of the present disclosure includes that a periodically cleaning occurs in response to a thickness of the foam being applied.

A further embodiment of any of the foregoing embodiments of the present disclosure includes that the thickness of the foam being applied is determined by a measurement from the remote manipulator.

A further embodiment of any of the foregoing embodiments of the present disclosure includes that the measurement from the remote manipulator comprises a difference between a foam surface and a surface to which the foam is being applied as determined by a laser measurement.

A further embodiment of any of the foregoing embodiments of the present disclosure includes that the periodically cleaning occurs in response to a difference between the foam surface and the surface to which the foam is being applied, the difference being less than a predetermined value.

A further embodiment of any of the foregoing embodiments of the present disclosure includes a third position that locates the nozzle adjacent to a solvent sprayer system of the cleaning station.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
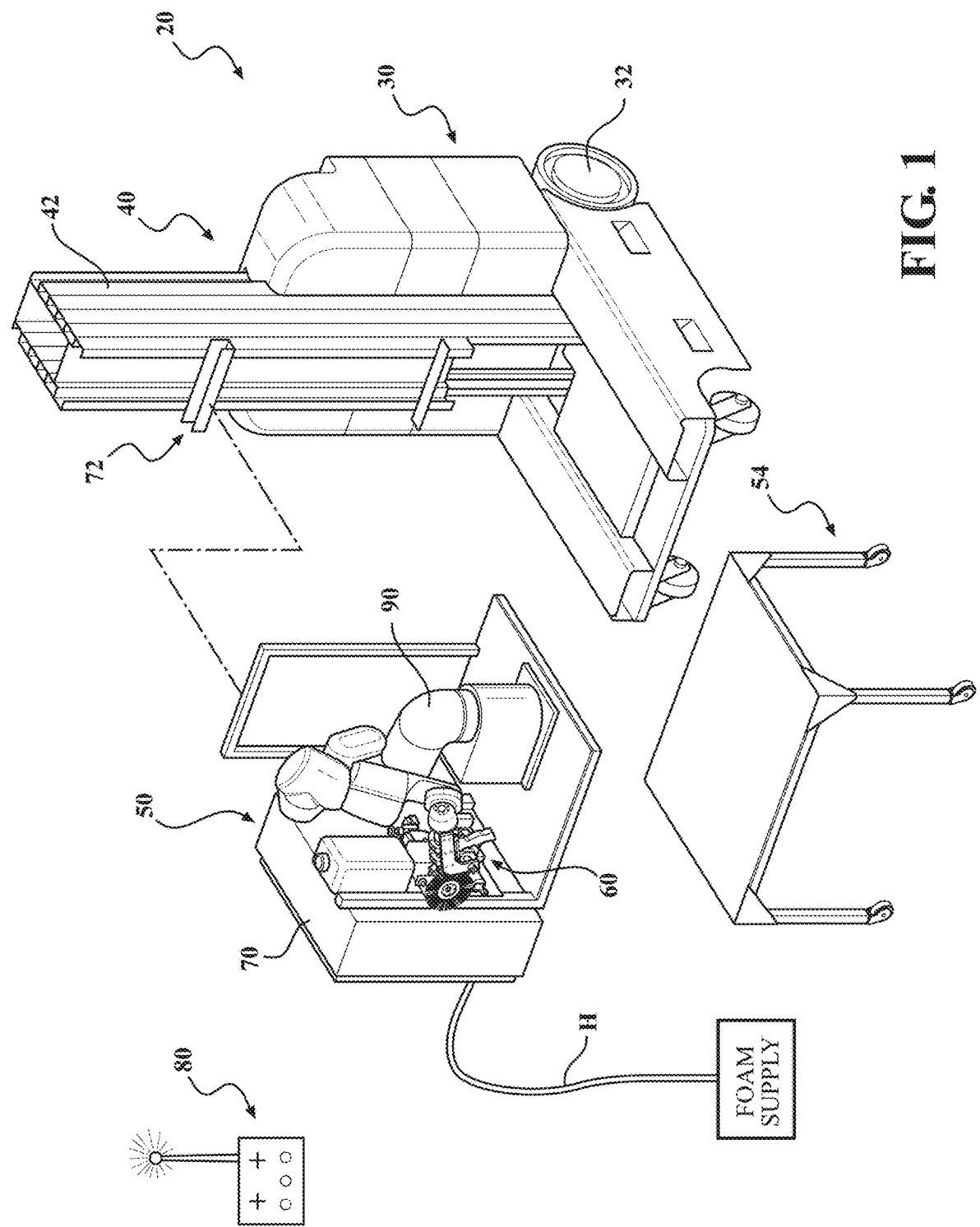
FIG. 1 is an exploded view of a remote spray foam system according to one disclosed non-limiting embodiment.
Figure 6:
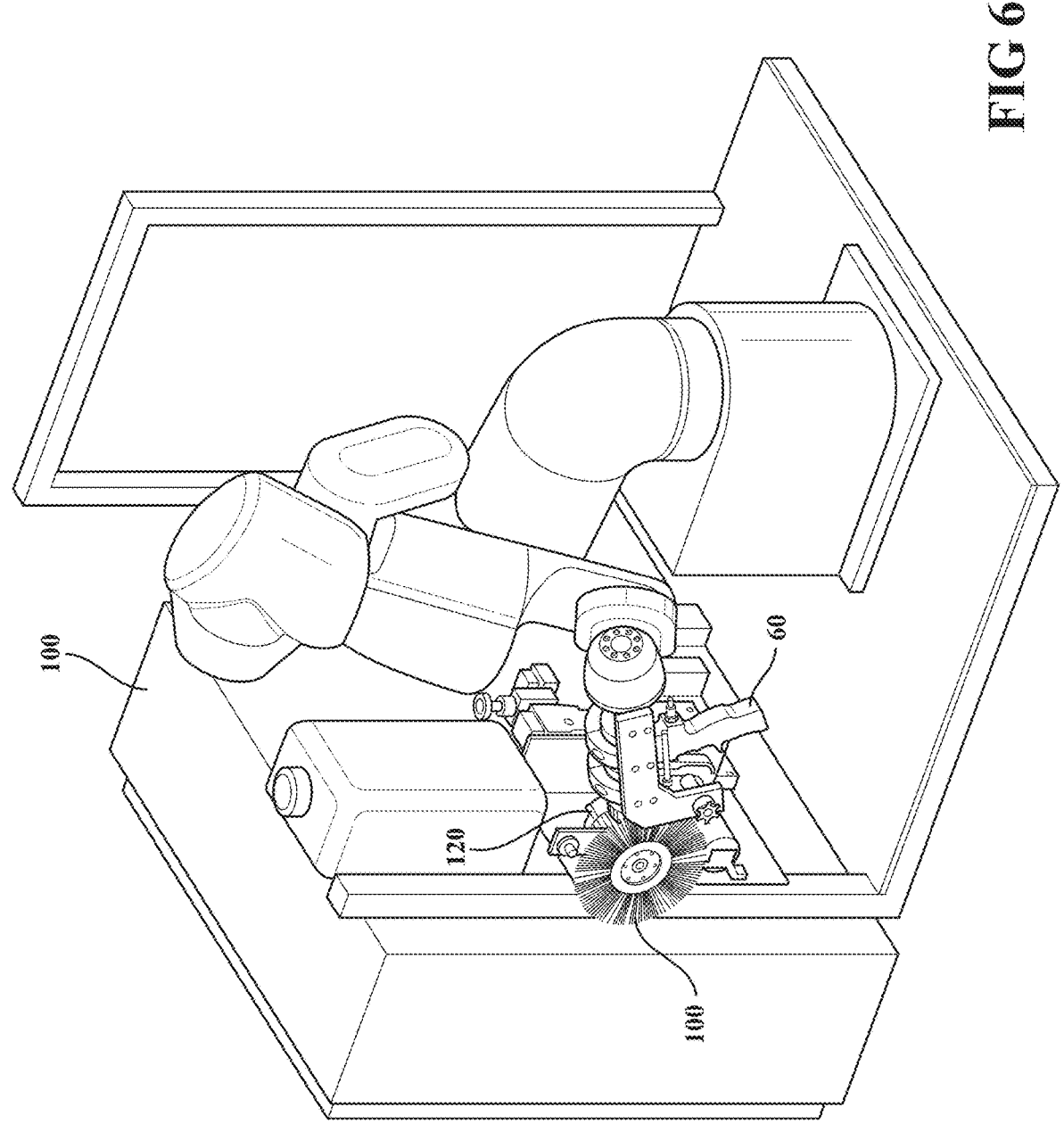
FIG. 6 is a perspective view of the spray gun positioned adjacent to a cleaning station of the remote spray foam system according to one disclosed non-limiting embodiment.

FIG. 1 schematically illustrates a remote spray foam system 20 that facilitates the application of an insulation foam with minimal requirements for use of Personal Protective Equipment (PPE). The remote spray foam system 20 generally includes a mobile platform 30, a mast 40, a robot platform 50, a spray gun 60, a control system 70, a control interface 80, a remote manipulator 90 and a cleaning station 100 (FIG. 6). It should be appreciated that the specific placements and connections of elements are exemplary only, and that these elements may be combined or have relative spatial locations other than those shown. It should also be appreciated that numerous supporting elements are not shown which may include for example and without limitation cabling, hoses or tubes for fluid transport, electro-mechanical servo-mechanisms for various movements of various elements, communications ports, self-contained portable lighting, etc.

The mobile platform 30 may include powered steerable wheels 32 or other motive devices such as caterpillar treads to provide locomotion and positioning of the mobile platform 30 in response to the control system 70. The mobile platform 30 may be, for example only, a JLG 20MVL drivable vertical mast manufactured by JLG which is an Oshkosh Corporation Company. In one embodiment, the mobile platform 30 may be remotely controlled via the control system 70 in response to the control interface 80. In another embodiment, the mobile platform 30 may be a fixed platform with the mast 40.

The mast 40 extends and retracts from the mobile platform 30 to provide a controlled vertical component to the robot platform 50 and the remote manipulator 90 that is attached thereto. The mast 40 may include a multiple of telescopic members 42 that selectively extend and retract via the control system 70 in response to the control interface 80. In one embodiment, the mast 40 may extend to heights of 18 feet.

Figure 2:
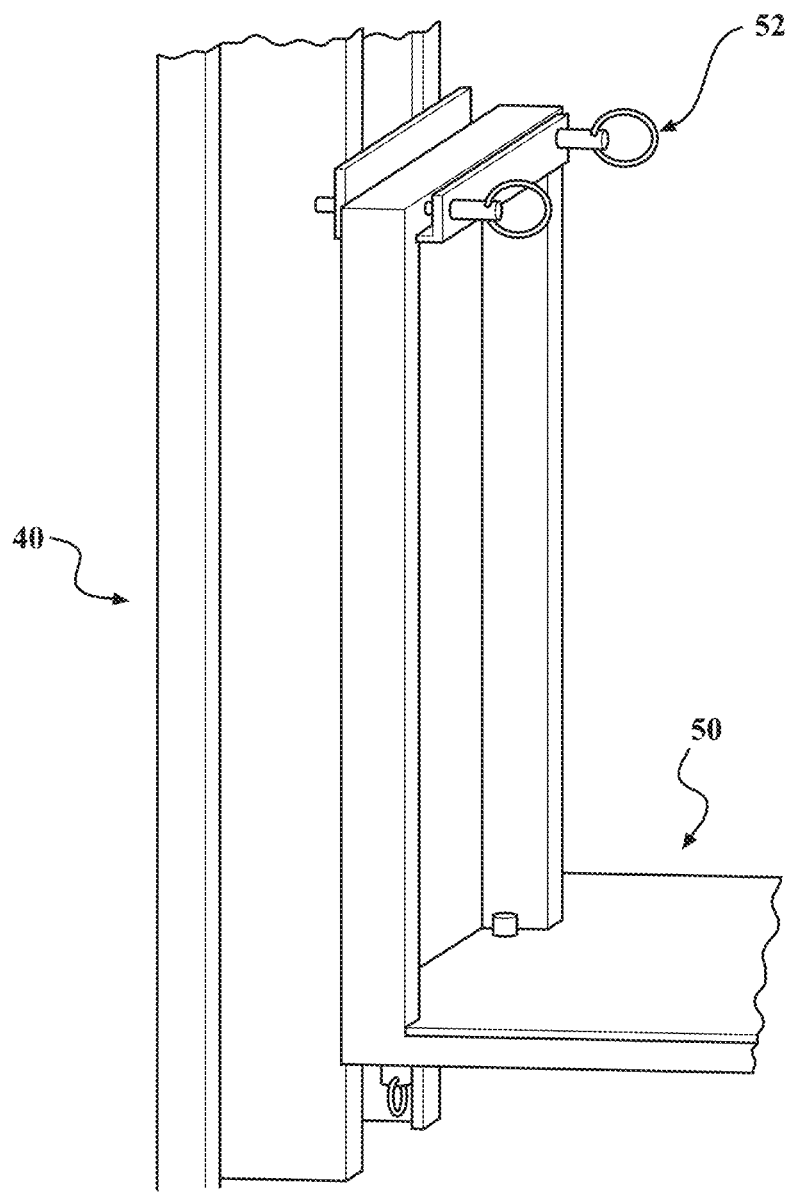
FIG. 2 is an expanded perspective view of a robot platform attached to a mast of a mobile platform.

The robot platform 50 is removably attached to the mast 40. The robot platform 50 includes a quick disconnect system 52 (also shown in FIG. 2) to mount the robot platform 50 via, for example, four (4) pins. The robot platform 50 may support and protect the control system 70, the remote manipulator 90 and the cleaning station 100. That is, the robot platform 50 contains the ancillary components, such as pumps, microprocessors, communication links with the mobile platform 30, computer hardware, fluid supplies, etc. The ancillary components may be protected within an enclosure.

Figure 3:
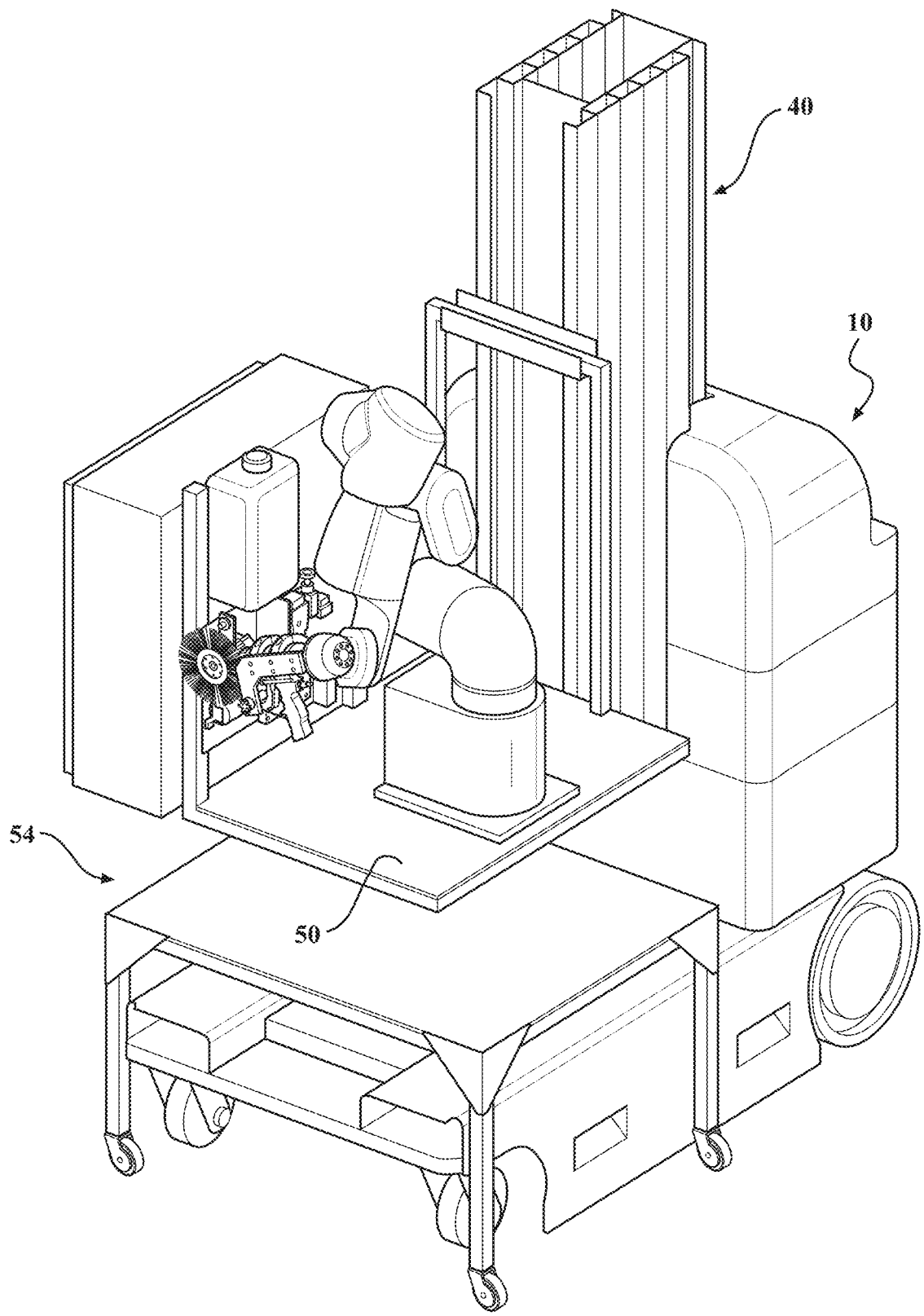
FIG. 3 is perspective view of the remote spray foam system.

To facilitate the attachment and removal of the robot platform 50 to the mast 40, a wheeled cart 54 may be positioned with respect to the mobile platform 30 (FIG. 3). The wheeled cart 54 may include lockable castors to receive the robot platform 50.

The spray gun 60 may be a conventional hand-held foam spray gun with a remote supply of foam from a foam source. The spray gun 60 may form polyurethane insulation foam from two unique liquid components that are communicated through hoses H such as through the correct combination of heat, pressure, and spray gun configuration. The mixing may occur by impingement in which the A-side chemical (known as ISO or Isocyanates) collides with the B-side chemical (known as Resin or Polyol-polyether resin) at a high velocity to mix properly. The spray gun 60 may spray and/or pour the foam.

Figure 4:
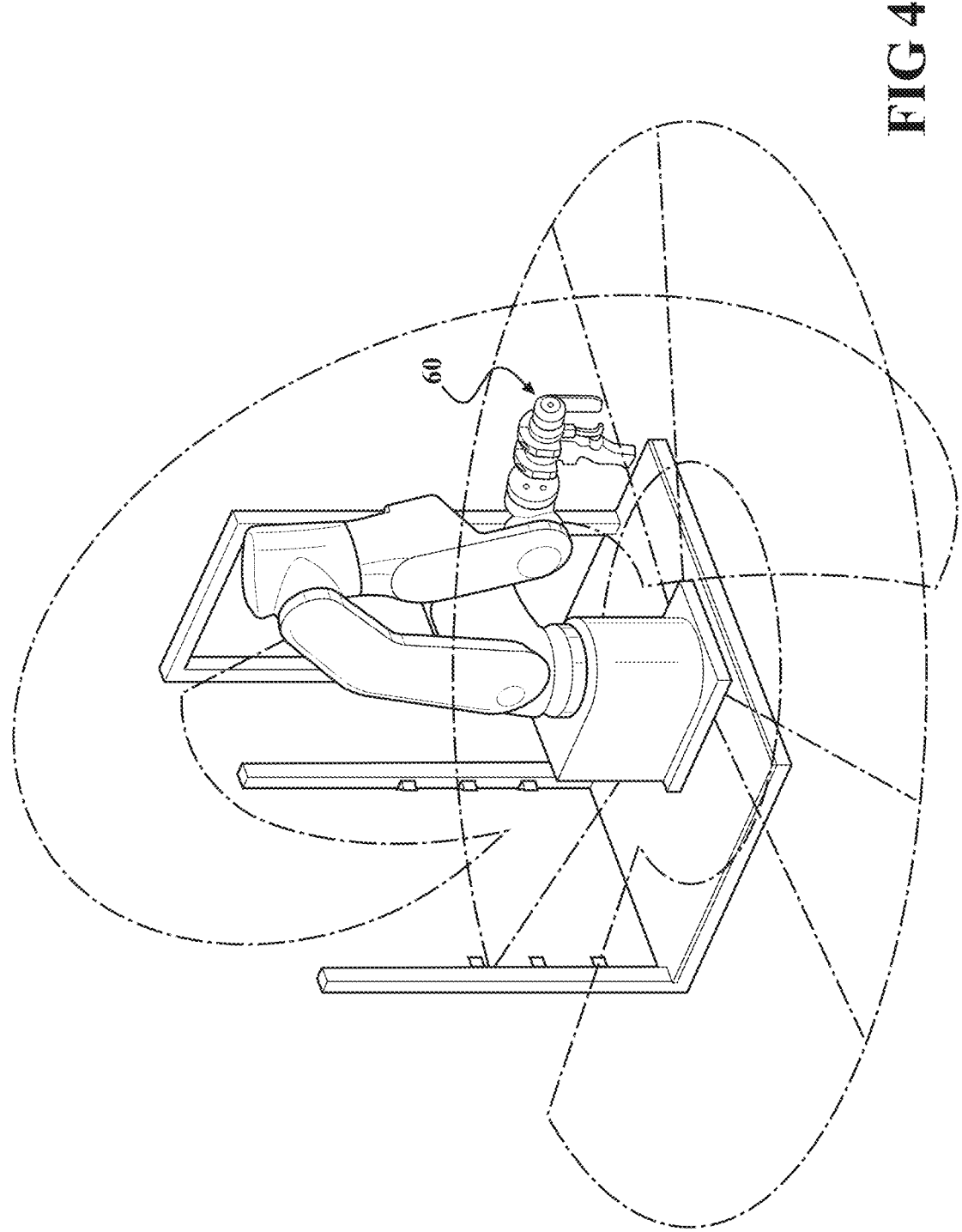
FIG. 4 is a schematic view of a 6-axis remote manipulator of the remote spray foam system.

With reference to FIG. 4, the remote manipulator 90 operates to receive and operate the spray gun 60. The remote manipulator 90 may include, for example, an Epson VT6L 6-Axis Robot that is operable to move in the x, y, and z planes. In addition, the 6-Axis Robot can perform roll, pitch, and yaw movements.

Each axis represents an independent motion, or degree of freedom, that allows the spray gun 60 to be moved to a programmed point in response to the control interface 80. The spray gun 60 may be in direct view of the operator or may include various camera, First person view, or other remote visual interfaces.

The movements for each axis of the six-axis robot may include: Axis one which is located at the base of the robot. With this axis the remote manipulator 90 is able to move from left to right for a complete 180 degrees of motion from its center. This provides a robot with the ability to move an object along a straight line; Axis Two controls the robot lower arm and provides the ability for the movement of forward and backward extensions. This allows a robot to mast an object, move it sideways, up and down, or to set the object down along the x or y planes; Axis Three provides the remote manipulator 90 with the ability to raise and lower the upper arm, expanding their vertical reach. Axis three makes parts more accessible to the remote manipulator 90 since it allows the same movements as axis two, but along all three x, y, and z planes; Axis Four allows the remote manipulator 90 to control the movements of the robot end of arm tooling (EOAT), e.g., the spray gun 60, and change the orientation through a rolling motion. The upper robotic arm will rotate in a circular motion in the roll movement; Axis Five also controls the movements of the robot end-effector along with axis four. Axis five is responsible for the pitch and yaw movements. Pitch movements involve moving the end-effector up and down. While yaw movements move the end-effector left and right; Axis Six is the wrist which is responsible for the complete 360-degree rotations of the wrist. The sixth axis provides the ability to change a part's orientation in the x, y, and z planes with roll, pitch, and yaw movements.

Figure 5:
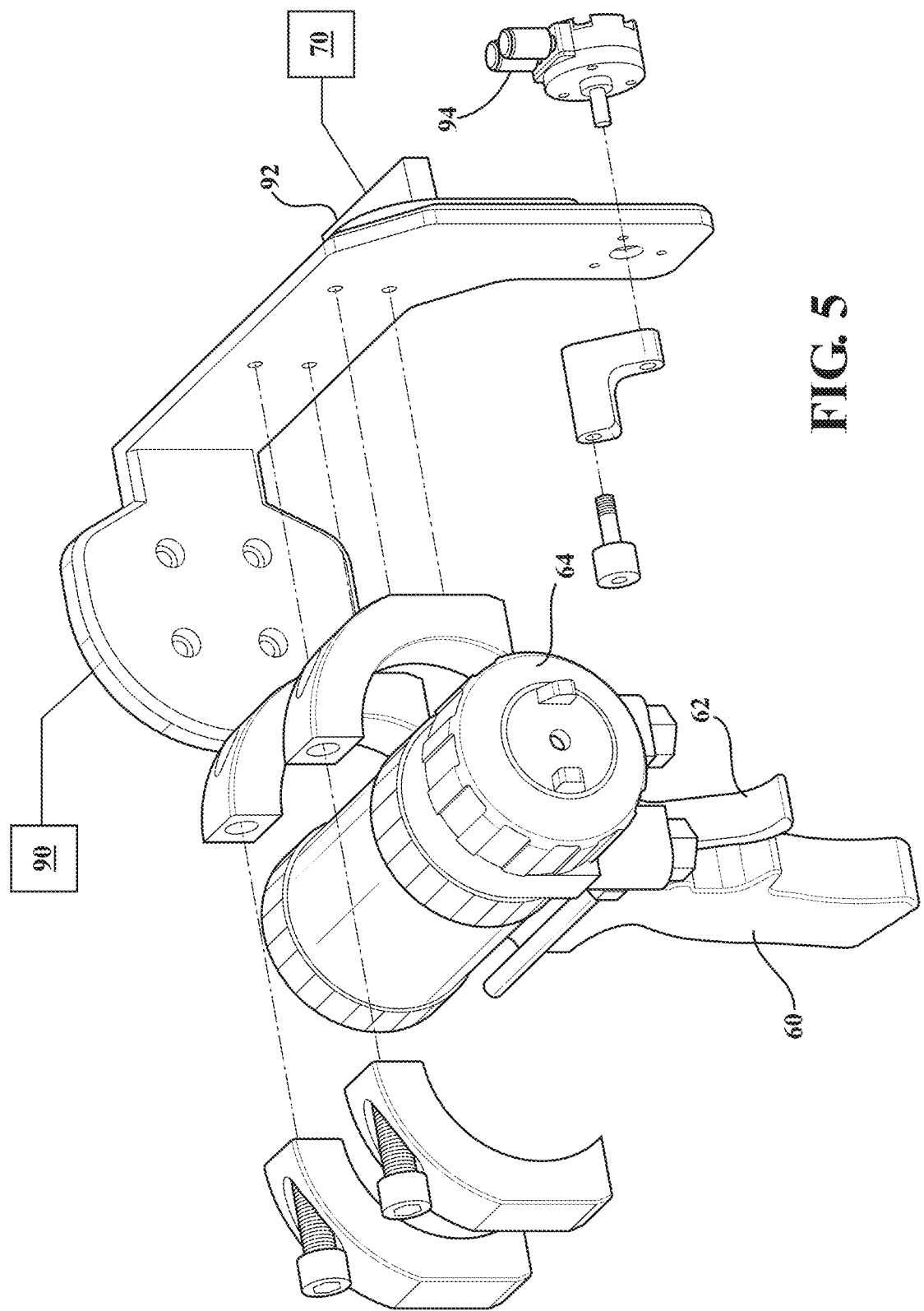
FIG. 5 is an exploded view of a first effector to operate the spray gun.

With reference to FIG. 5, the remote manipulator 90 provides the ability to mount and operate different types of spray guns. The spray gun 60 may be a conventional hand-held foam spray gun of various types. The spray gun 60 may be attached as end of arm tooling (EOAT) or other dedicated attachment that may be attached using a hand screw/quarter turn for ease of mounting. The spray gun 60 may be removed from the remote manipulator 90 if need be for transport and for access if manual spraying is required. In one embodiment, a static spray gun mount serves as the main structure of the spray gun EOAT. The spray gun 60 may be attached to a hinged spray gun mount that is then connected to a static spray gun mount assembly via a shoulder bolt, allowing the hinged mount to rotate freely. Thumb screws are then used to secure the hinged spray gun to the static assembly to position the spray gun in the process.

The remote manipulator 90 may include a first effector 94 to operate the spray gun 60. The first effector 94 may be a pneumatic rotary actuator, stepper motor, servo, linear actuator, or other device in communication with the control system 70 to selectively operate the spray gun 60. The first effector 94 is positioned adjacent to a trigger 62 of the spray gun 60 to operate a nozzle 64 of the spray gun 60. The first effector 94 is operable to actuate the trigger 62 and thereby spray the foam as in manual operation of the spray gun 60. In one embodiment, the first effector 94 may utilize a track roller connected to a pneumatic rotary actuator such that, when activated, the track roller contacts the spray gun trigger to initiate foam spraying.

Figure 7:
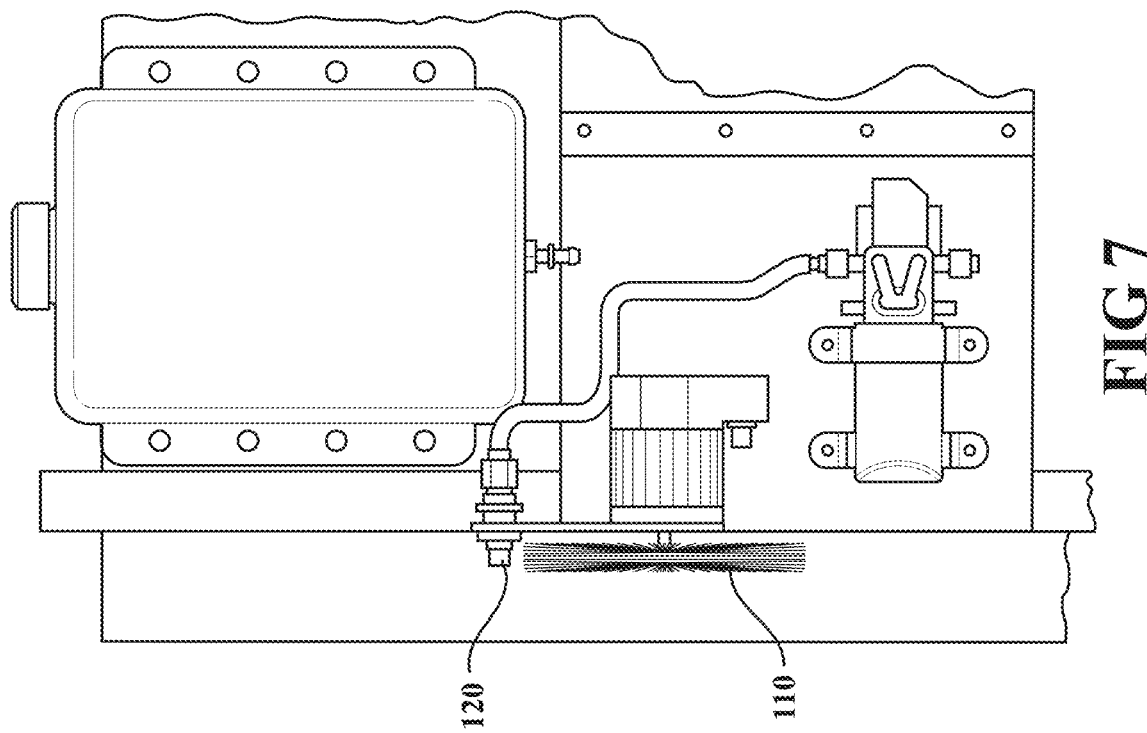
FIG. 7 is an expanded front view of the cleaning station of the remote spray foam system according to one disclosed non-limiting embodiment.
Figure 8:
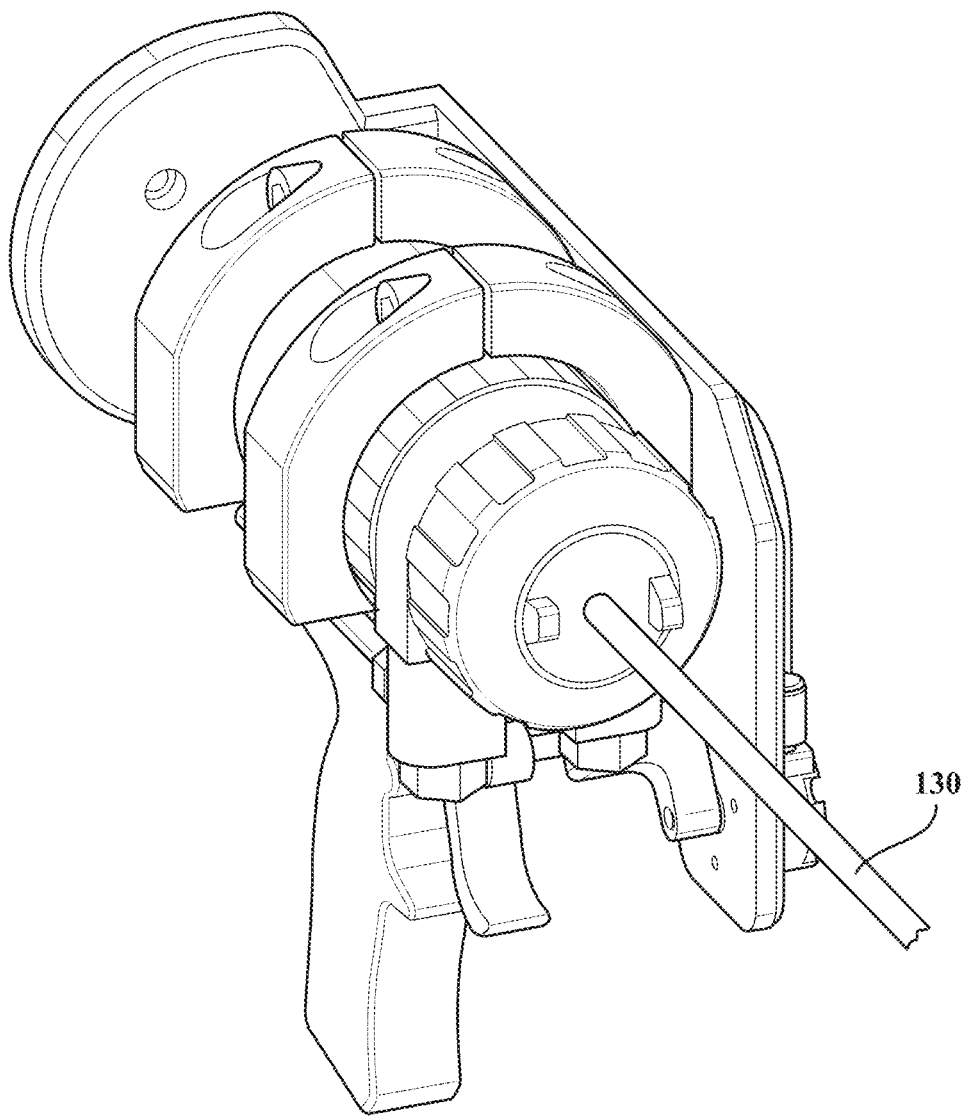
FIG. 8 is an expanded perspective view of an internal nozzle cleaner system of the cleaning station of the remote spray foam system according to one disclosed non-limiting embodiment.

With reference to FIG. 6, the cleaning station 100 is mounted to the robot platform 50 adjacent to the remote manipulator 90. The cleaning station 100 may include a brush system 110 (FIG. 7), a solvent sprayer system 120 (FIG. 7), and/or an internal nozzle cleaner system 130 (FIG. 8) to clean the nozzle 64 of the spray gun 60. The brush system 110 may include, for example, a wire brush driven by a 24-75DC clear path motor. The brush system 110 may cover the entire tip of the nozzle 64 to assure cleaning. The solvent sprayer system 120 may spray or drip a solvent such as, for example, N Methyl Pyrrolidone (NMP), Dynasolve CU-6, SB Versaflex-brand, etc.

Figure 9:
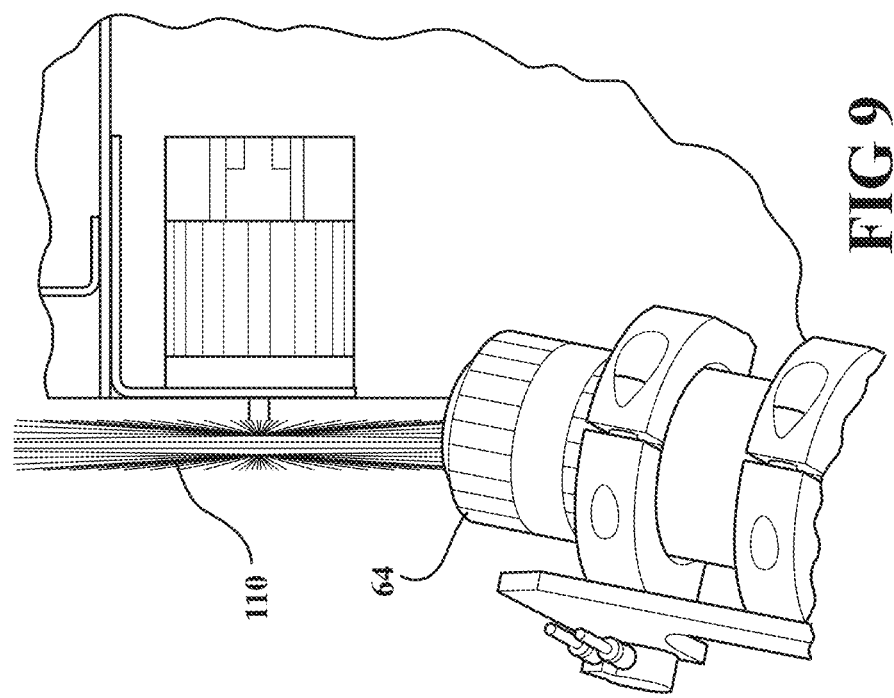
FIG. 9 is an expanded perspective view of a brush system of the cleaning station of the remote spray foam system according to one disclosed non-limiting embodiment.

The remote manipulator 90, the brush system 110, the solvent sprayer system 120, and/or the internal nozzle cleaner system 130 may operate automatically and/or manually to clean the nozzle 64. That is, a preprogrammed position (FIG. 9) may be defined by the remote manipulator 90 to position the nozzle 64 against the brush system 110 via, for example, a one touch button on the control interface 80. The solvent sprayer system 120 may spray the nozzle 64 and/or the brush system 110 with a solvent. The internal nozzle cleaner system 130 may include, for example, a drill bit, rod, rod brush, etc. that internally cleans the nozzle 64. Alternatively, or additionally, the remote manipulator 90 may override current spraying operations to automatically position the nozzle 64 with respect to the cleaning station 100 every predetermined time period such as, for example, every 20 minutes.

Figure 10:
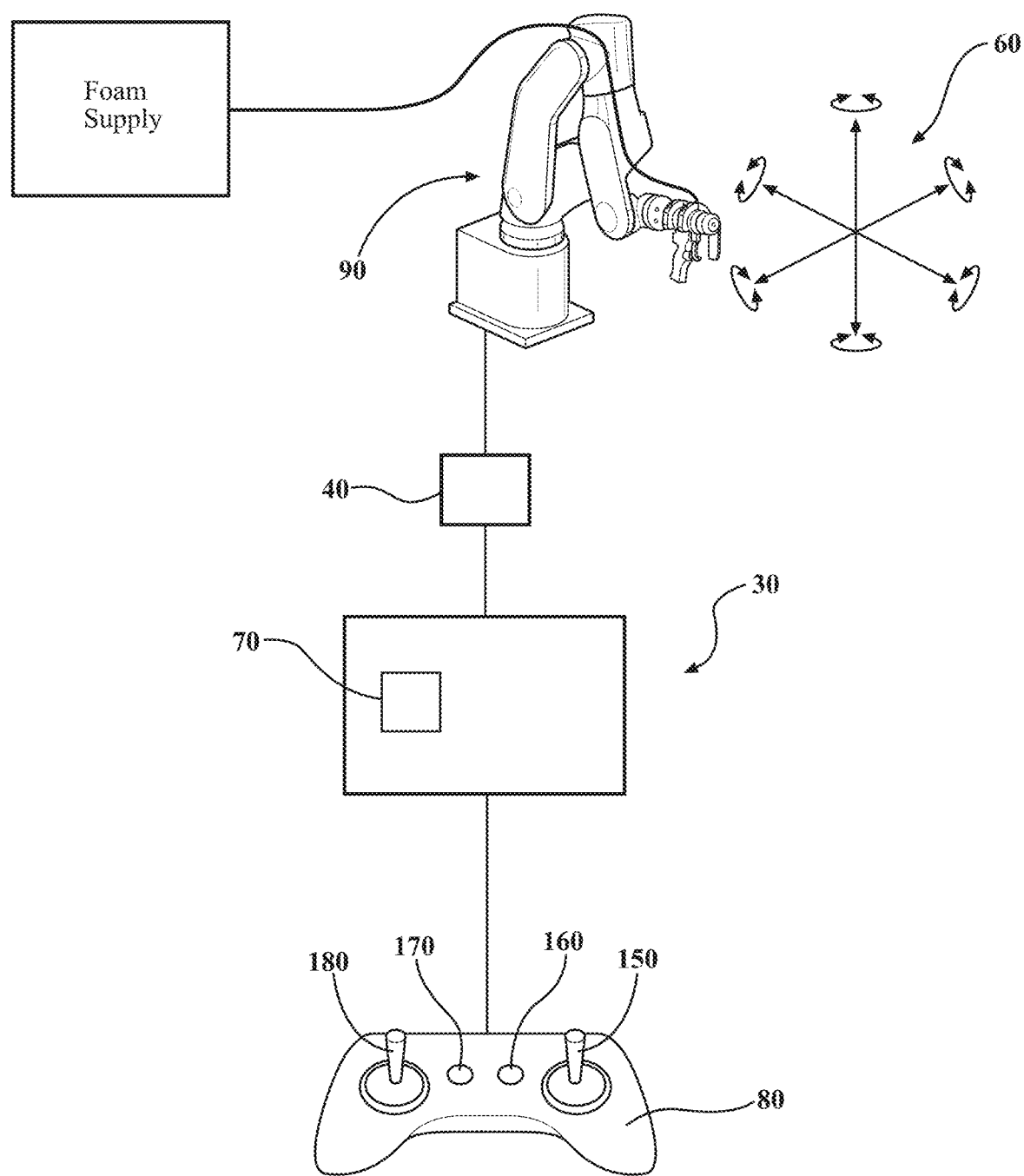
FIG. 10 is a schematic view of a control system for the remote spray foam system according to one disclosed non-limiting embodiment.

With reference to FIG. 10, the control system 70 (illustrated schematically) may include a processor, a memory, and an interface. The processor may be any type of known microprocessor having desired performance characteristics. The memory may be any computer readable medium which stores data and control algorithms such as the logic utilized to operate the remote spray foam system 20 in response to the control interface 80. The control interface 80 receives user input so as to remotely position and operate the spray gun 60.

The control interface 80 may provide a wired or wireless connection via, for example, Bluetooth, Wi-fi, cellular etc. The control interface 80 may include various manual input devices such as switches, toggles, joysticks, etc. The control interface 80, in one embodiment, may include a right joystick 150 to remotely position the spray gun 60, a button 160 to operate the first effector 94 to spray the foam, a button 170 to automatically position the spray gun 60 to the cleaning position for cleaning at the cleaning station 100, a left joystick 180 to remotely position the mobile platform 30, a button 190 to operate the height of the mast 40, etc.

Various other configurations as well as automated computer control can be utilized in addition, or in the alternative, to the manual control interface 80. Alternatively, the control system 70 may include an interface that permits a programming interface in which a user measures all the openings and perimeters of a side of the structure so that the remote spray foam system 20 will autonomously spray in accords with the measurements.

The control interface 80 provides for remote operation of the remote spray foam system 20 without the user having to manually hold the spray gun 60. That is, the remote spray foam system 20 may be positioned within visual range of the user, which may allow a reduction in the use of PPE by the user who need not be directly adjacent to the spray such as, for example, when spraying the roof of a pole barn or other structure.

Figure 11:
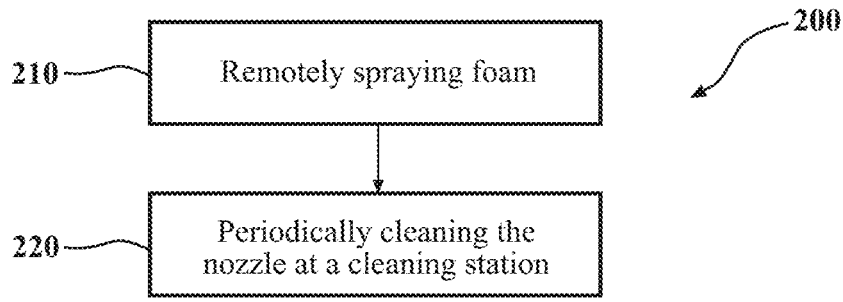
FIG. 11 is a schematic block diagram of a method for operating the remote spray foam system.

With reference to FIG. 11, a method 200 for operating the remote spray foam system 20 is schematically illustrated. The functions may be programmed software routines capable of execution in various microprocessor-based electronics control embodiments and are represented herein as block diagrams.

The method 200 includes remotely spraying foam (210) from the hand-held spray gun 60 and periodically cleaning (220) the nozzle 64 at the cleaning station 100. The nozzle 64 must be cleaned while foaming to allow for consistency throughout the foam for a consistent product thickness.

In one embodiment, the periodically cleaning (220) occurs in response to the control system 70 that receives distance measurements from, for example, a laser 92 (FIG.

Figure 12:
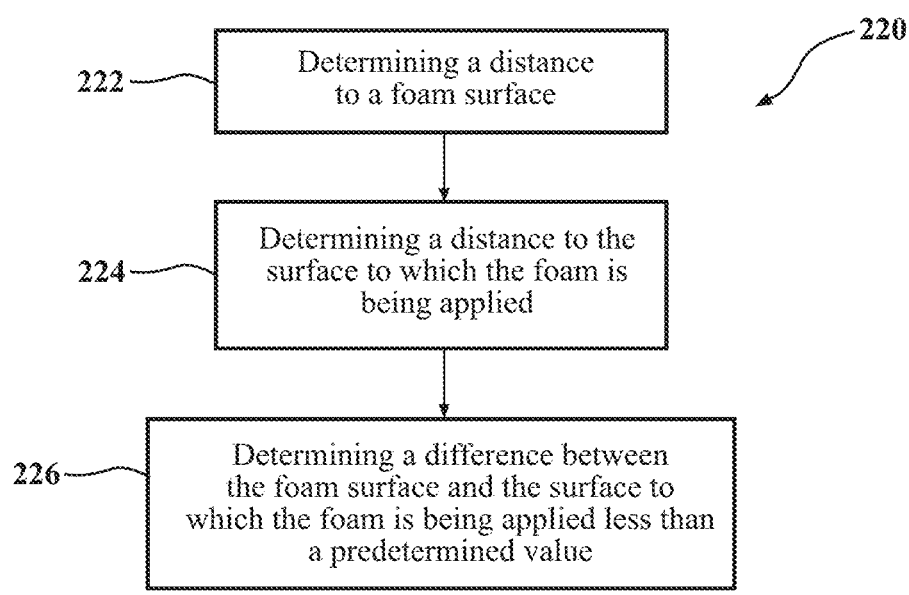
FIG. 12 is a schematic block diagram of a method for periodically cleaning the remote spray foam system.
Figure 13:
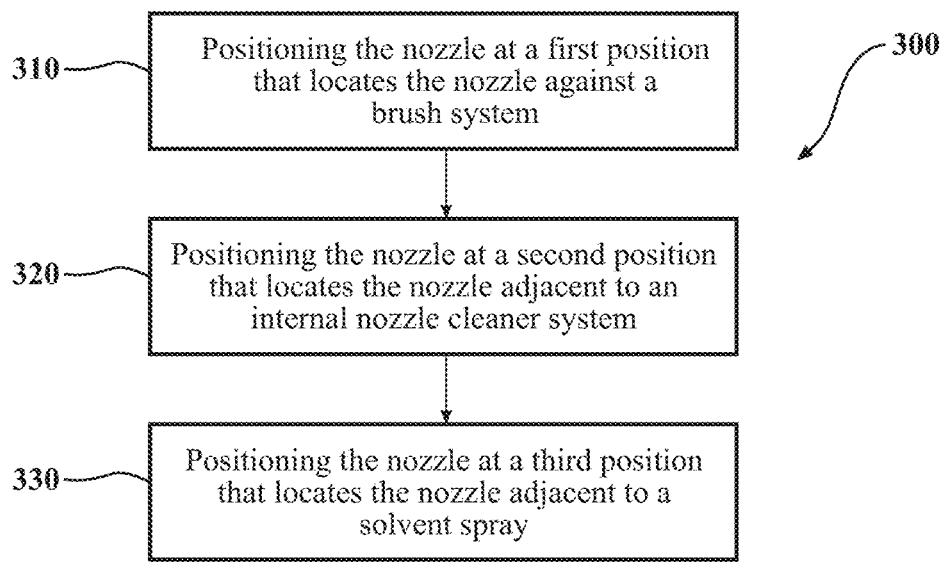
FIG. 13 is a schematic block diagram of a method for a cleaning process of the remote spray foam system.

5) that may be mounted to the remote manipulator 90. The periodically cleaning (220) may include determining a distance to a foam surface (222); determining a distance to the surface to which the foam is being applied 224; then determining a difference between the foam surface and the surface to which the foam is being applied, i.e., a foam thickness, being less than a predetermined value (226; FIG. 12), such as, for example, two inches. The laser 92 provides the distance information to the control system 70 which then determines when to override the spraying operation and begin the cleaning process 300 (FIG. 13). This provides for efficient and consistent operation as compared to cleaning at a predetermined time interval. In one embodiment, a cover protects the laser 92 from spray foam such that, using a pneumatic slide table, the cover can be extended, allowing use of the laser 92. The cover remains retracted while spraying foam.

In one embodiment, the cleaning process 300 may include positioning the nozzle 64 at a first position that locates the nozzle 64 against the brush system 110 (310), positioning the nozzle 64 at a second position that locates the nozzle 64 adjacent to the internal nozzle cleaner system 130 (320), then positioning the nozzle 64 at a third position that locates the nozzle 64 adjacent to a solvent sprayer system 120 (330).

In one embodiment, the brush system 110 may utilize 3 inch diameter brush wheel coupled to a servo motor such that rotation of the brush removes spray foam and other contaminants located on the front face of the spray gun nozzle.

In one embodiment, the solvent sprayer system 120 may utilize a solenoid valve to allow solvent to exit via the misting nozzle and be distributed onto the spray gun nozzle.

Figure 15:
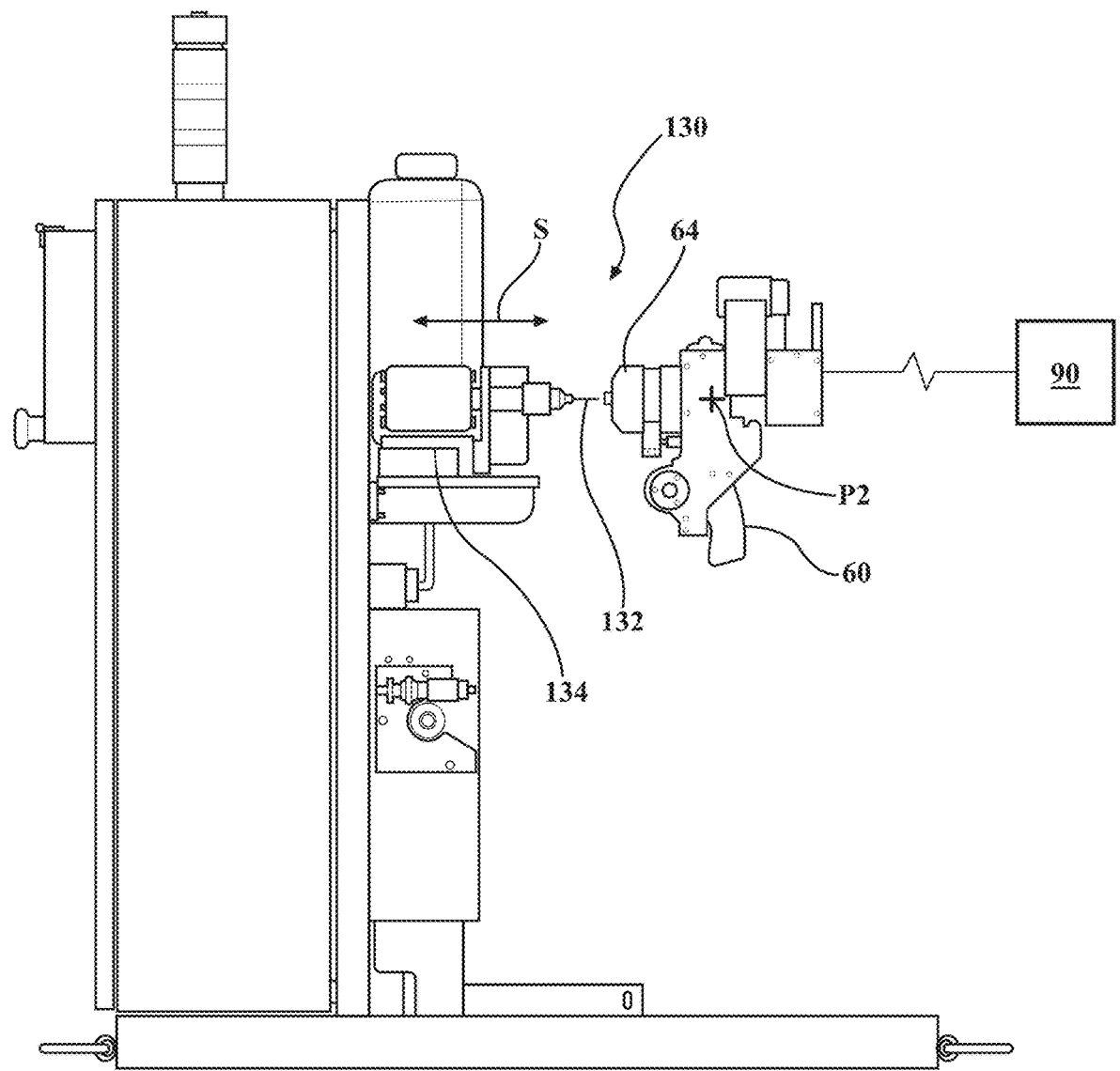
FIG. 15 is a side view of an internal nozzle cleaner system.

In one embodiment, the internal nozzle cleaner system 130 may utilize a servo motor to rotate a drill bit 132 (FIG. 15). The assembly rides upon a pneumatic slide table 134 (FIG. 15) such that the drill bit assembly may be inserted/retracted as needed.

Figure 14:
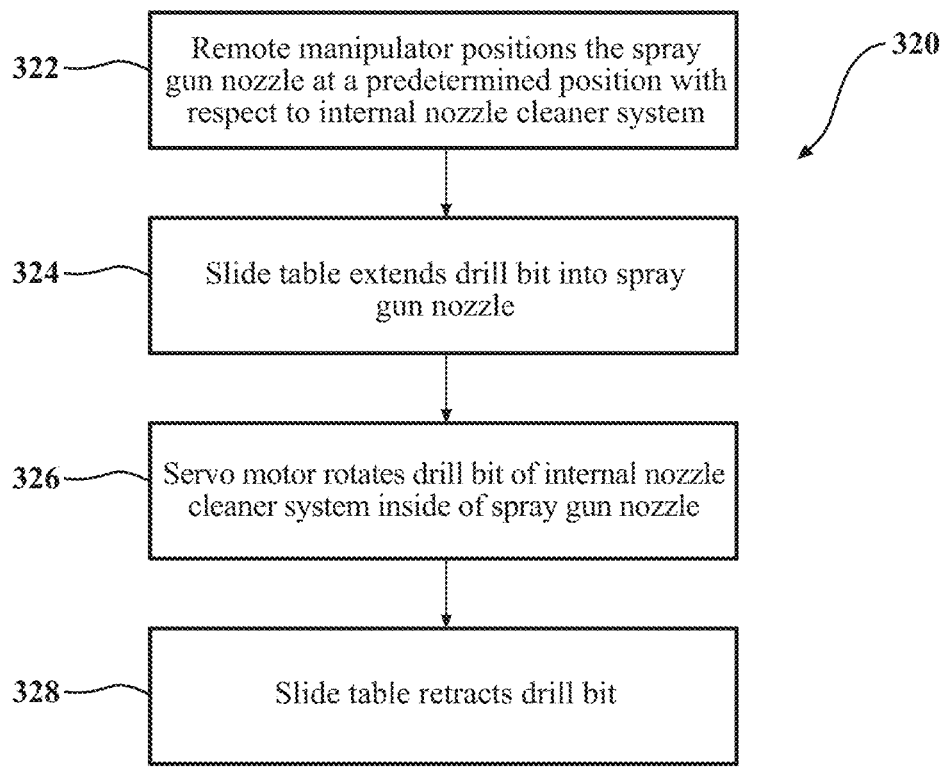
FIG. 14 is a schematic block diagram of a method for a cleaning process using an internal nozzle cleaner system.

With reference to FIG. 14, the cleaning process 300 defines the second position P2 (FIG. 15) that locates the nozzle 64 by the remote manipulator 90 so as to be adjacent to the internal nozzle cleaner system 130 (320; FIG. 13) such that the nozzle 64 is aligned with drill bit assembly (322). That is, the second position P2 is predefined in space by the control system 70 to permit operation of the internal nozzle cleaner system 130. The slide table 134 then extends (illustrated schematically by arrow S) the drill bit 132 into the spray gun nozzle 64 (324). The servo motor rotates the drill bit 132 inside of spray gun nozzle 64 (326) to clean the spray gun nozzle 64. The slide table 134 then retracts (illustrated schematically by arrow S) the drill bit 132 (328) such that the spray gun 60 may be moved away from the second position P2 to continue spraying. Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. A method for operating a remote spray foam system, the remote spray foam system comprising:
   a mobile platform with a mast;
   a robot platform removably mounted to the mast; the mast extends to heights from the mobile platform to provide a controlled vertical component to the robot platform;
   the remote manipulator mounted to the robot platform;
   a spray gun;
   wherein said spray gun is a hand-held spray gun operable to spray a foam, the spray gun removably mountable to the remote manipulator; the spray gun having a nozzle;
   a control system in communication with the remote manipulator to position and operate the spray gun,
   and
   the remote manipulator includes a first effector;
   the first effector positioned adjacent to a trigger of the spray gun to operate the spray gun to spray the foam,
   a cleaning station mounted to the robot platform adjacent to the remote manipulator;
   the cleaning station includes a brush system and an internal nozzle cleaner system;
   the method comprising:
   remotely spraying the foam from the spray gun of the remote spray foam system by actuating the trigger with the first effector; said spray gun removably mountable to the remote manipulator of the remote spray foam system to spray the foam on a structure; and
   overriding current spraying operations and begin a cleaning process wherein a periodically cleaning occurs in response to the control system and in response to a thickness of the foam being applied or at a predetermined time interval;
   positioning the nozzle of the spray gun with respect to a first position that locates the nozzle against the brush system of the cleaning station mounted to the mobile platform;
   positioning the nozzle of the spray gun at a second position that locates the nozzle adjacent to the internal nozzle cleaner system of the cleaning station.

2. The method as recited in claim 1, wherein the thickness of the foam being applied is determined by a measurement from the remote manipulator.

3. The method as recited in claim 2, wherein the measurement from the remote manipulator comprises a difference between a foam surface and a surface to which the foam is being applied as determined by a laser measurement.

4. The method as recited in claim 3, wherein the periodically cleaning occurs in response to a difference between the foam surface and the surface to which the foam is being applied, the difference being less than a predetermined value.

5. The method as recited in claim 1, further comprising:
   positioning the nozzle at a third position adjacent to a solvent sprayer system of the cleaning station.

6. The method as recited in claim 1, wherein the remote manipulator is a robot.

7. The method as recited in claim 1, wherein the first effector is a pneumatic rotary actuator, a stepper motor, a servo, a linear actuator, or a track roller.

8. The method as recited in claim 1, wherein the first effector utilizes a track roller connected to a pneumatic rotary actuator.

9. A method for operating a remote spray foam system, the remote spray foam system comprising:
a mobile platform with a mast;
a robot platform removably mounted to the mast; the mast extends to heights from the mobile platform to provide a controlled vertical component to the robot platform;
the remote manipulator mounted to the robot platform;
a spray gun;
the spray gun having a nozzle;
a control system in communication with the remote manipulator to position and operate the spray gun,
a cleaning station mounted to the robot platform adjacent to the remote manipulator; and
the cleaning station includes a brush system and an internal nozzle cleaner system;
the method comprising:
remotely spraying the foam from the spray gun of the remote spray foam system;
said spray gun removably mountable to the remote manipulator of the remote spray foam system to spray the foam on a structure; and
overriding current spraying operations and begin a cleaning process wherein a periodically cleaning occurs in response to the control system and in response to a thickness of the foam being applied or at a predetermined time interval;
positioning the nozzle of the spray gun with respect to a first position that locates the nozzle against the brush system of the cleaning station mounted to the mobile platform;
positioning the nozzle of the spray gun at a second position that locates the nozzle adjacent to the internal nozzle cleaner system of the cleaning station.

10. The method as recited in claim 9, wherein the thickness of the foam being applied is determined by a measurement from the remote manipulator.

11. The method as recited in claim 10, wherein the measurement from the remote manipulator comprises a difference between a foam surface and a surface to which the foam is being applied as determined by a laser measurement.

12. The method as recited in claim 11, wherein the periodically cleaning occurs in response to a difference between the foam surface and the surface to which the foam is being applied, the difference being less than a predetermined value.

13. The method as recited in claim 9, further comprising:
positioning the nozzle at a third position adjacent to a solvent sprayer system of the cleaning station.

14. The method as recited in claim 9, wherein the remote manipulator is a robot.

15. The method as recited in claim 9, wherein the remote manipulator includes a first effector;
the first effector is a pneumatic rotary actuator, a stepper motor, a servo, a linear actuator, or a track roller.

16. The method as recited in claim 9, the remote manipulator includes a first effector;
wherein the first effector utilizes a track roller connected to a pneumatic rotary actuator.

* * * * *